Dec. 27, 1927.  
C. A. CAMPBELL  
1,653,985  
AIR BRAKE  
Filed March 6, 1926  2 Sheets-Sheet 2
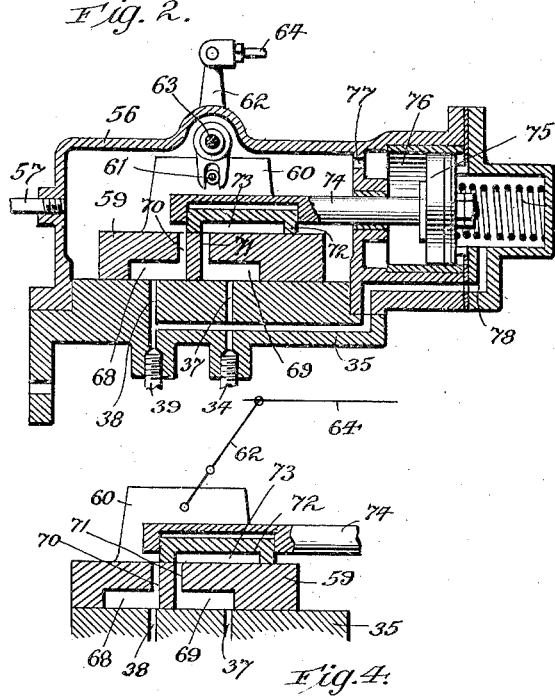
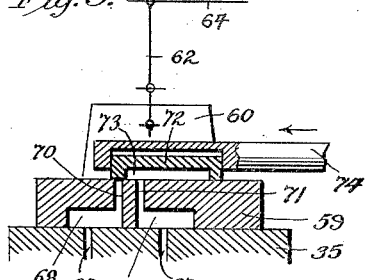
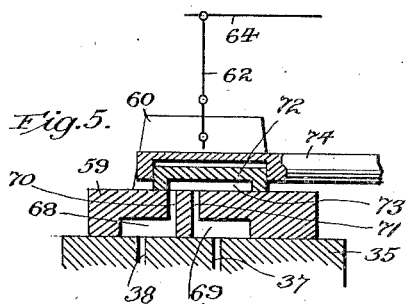
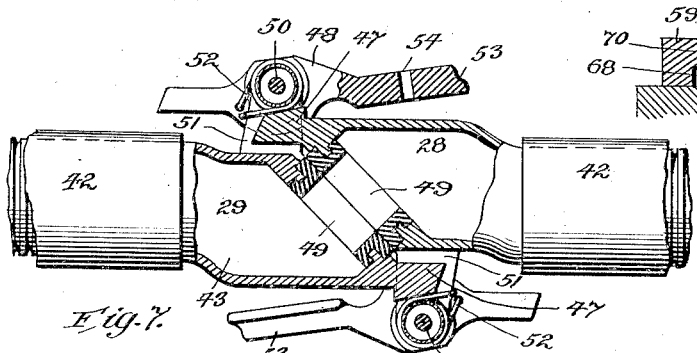
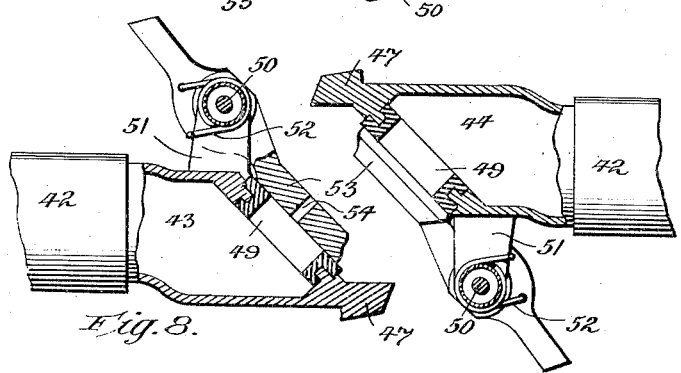

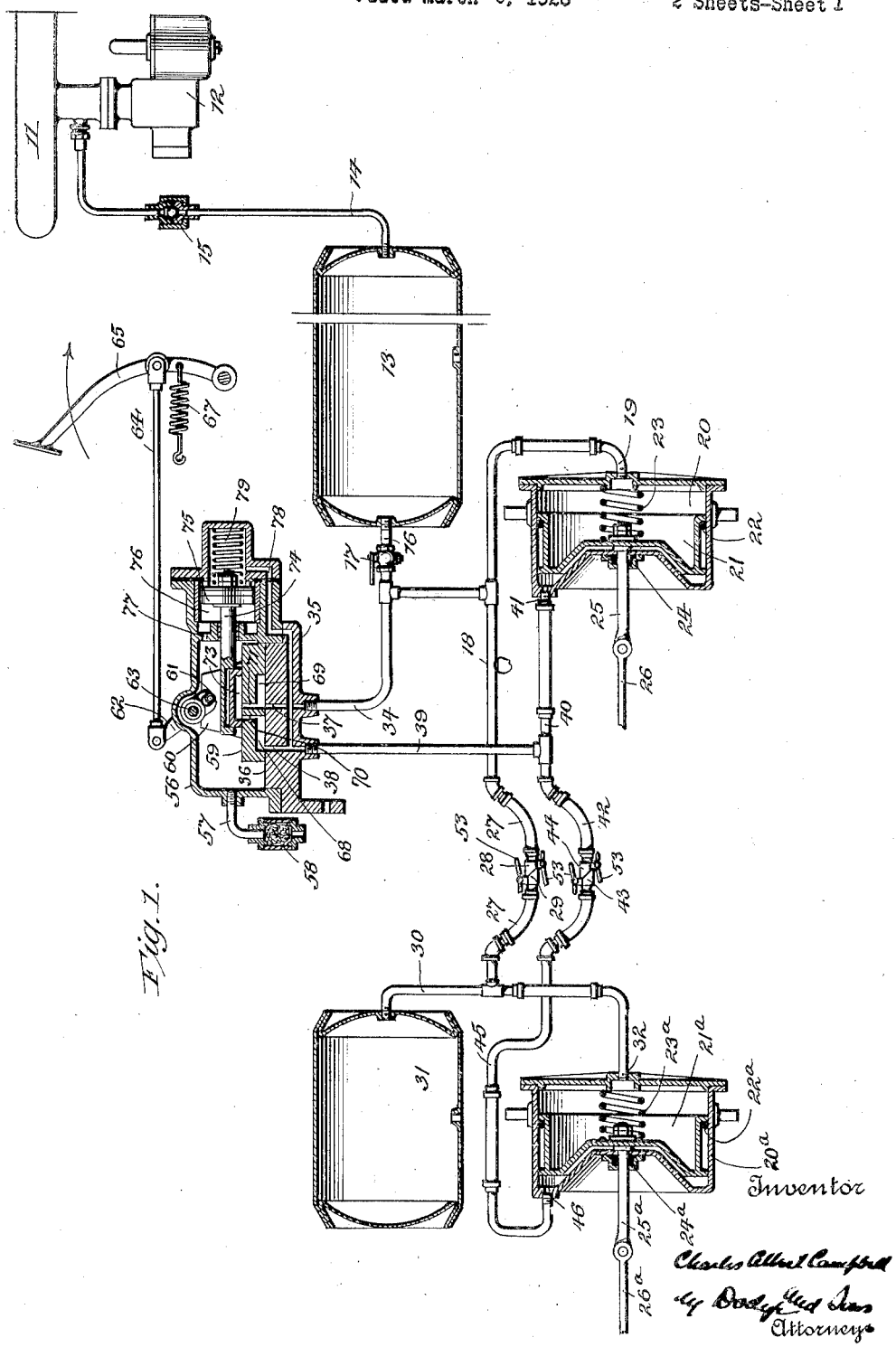

Patented Dec. 27, 1927.

1,653,985

UNITED STATES PATENT OFFICE.

CHARLES ALBERT CAMPBELL, OF WATERTOWN, NEW YORK, ASSIGNOR TO THE NEW YORK AIR BRAKE COMPANY, A CORPORATION OF NEW JERSEY.

AIR BRAKE.

Application filed March 6, 1926. Serial No. 92,857.

This invention relates to fluid pressure brakes, and particularly to that type of air brake operating at sub-atmospheric pressure and commonly called "vacuum brakes".

The object of the invention is to produce a brake of this type peculiarly adapted for use on a motor vehicle propelled by a gasolene engine and available for use not only on the motor propelled vehicle but also on a trailer drawn thereby.

The vacuum type of brake is peculiarly adapted for this field of use for two reasons. In the first place, a simple connection to the intake manifold of the engine suffices as a means for developing the sub-atmospheric pressure needed in the operation of the brake. In the second place there is no tendency for moisture to condense in the brake system. This last is a constant source of trouble in high pressure brakes and is peculiarly troublesome on motor road vehicles because the brake apparatus is exposed and readily freezes up when any moisture is present.

Generally stated, brakes are operated by pistons which in release condition are subject on both sides to sub-atmospheric pressure. In application position communication between opposite sides of the piston is interrupted and air under atmospheric pressure is admitted to act on one side of the piston.

In order to secure the desired flexibility a reservoir maintained at the desired sub-atmospheric pressure is included in the system, and a similar reservoir is used on the trailer so that in case of a break-in-two the trailer brakes will apply.

An improved feature of the invention is the application valve so arranged that it graduates the brakes on and off, maintaining pressures which correspond strictly to the position of the brake lever or pedal. Valves for accomplishing this function have been known before, but have not proved satisfactory, for certain structural and operative reasons. The present valve is designed to overcome these difficulties.

The main valve, which is shifted by the brake pedal through a progressive range of positions, is in effect merely a shifting valve seat and carries two ports. One of these ports is constantly connected with one end of the brake cylinder, and with the actuating cylinder for the riding valve hereinafter described. The other port is constantly connected with sub-atmospheric pressure reservoir and with the other end of the brake cylinder. Co-acting with the main valve is a graduating slide valve. In one position relatively to the main slide valve this riding valve connects the ports in the main valve together and thus places both ends of the brake cylinder in communication with the sub-atmospheric pressure reservoir. In another position it interrupts the connection between two ports in the main valve and admits atmospheric air to one of them to apply the brakes. There is an intermediate lap position in which the admission of atmospheric pressure is interrupted without however establishing communication with the two ends of the brake cylinder.

The riding valve is actuated by a piston which is subject in one direction to atmospheric pressure tending to open the valve and produce an application, and in the other direction to brake cylinder pressure assisted by a spring tending to close or lap the valve and restore release conditions. Thus the position of the riding valve is directly proportional to the brake cylinder pressure.

It will be obvious from an inspection of the drawings that the effect is to establish in the brake cylinder definite pressures corresponding to definite positions of the main valve and to graduate the pressure on and off at will. Where the brake valve is actuated by a foot pedal this may be provided with a return spring, so that in operating the foot pedal the action of an ordinary mechanical foot brake is closely simulated except that the force exerted on the pedal is less.

Another feature of the invention is that the main valve is given a range of movement slightly greater than that of the graduating valve. Thus in the extreme application position of the main valve it is impossible for the riding valve to lap the admission port, the range of motion being insufficient. This insures a full application upon full depression of the pedal without any disturbing action of the graduating valve.

In the drawings is illustrated, largely in diagram, a practical embodiment of the invention. In the drawings—

Figure 1 is a diagrammatic view, largely sectional, showing the complete installation on a motor vehicle and trailer. In this view all the parts are shown in release position.

Figure 2 is a view of the brake valve on a slightly enlarged scale, showing the valve in service position.

Figure 3 is a diagram showing the valve in service lap position. The arrow on this figure indicates the direction in which the riding valve moved to reach this position.

Figure 4 is a similar diagram showing the parts in full service position.

Figure 5 is a diagram showing the parts in release position.

Figure 6 is a diagram showing the parts in release lap position. The arrow in this figure indicates the direction in which the riding valve moved to lap position.

Figure 7 is a view, partly in section, and partly in elevation, showing the hose coupling between the truck and trailer in normal connective position on the reservoir pipe.

Figure 8 is a similar view showing the position assumed by the parts of the hose connection in case of a break-in-two.

In the drawings, 11 is the manifold of an internal combustion engine of the type in which the engine draws in its own charges by suction. A common gasolene automobile engine is a familiar example of this type. 12 indicates the carburetor. A sub-atmospheric pressure reservoir 13 is connected by a pipe 14 through a check valve 15 with the intake passage, preferably between the carburetor 12 and the manifold 11. Check valve 15 opens toward the manifold and when the engine is running it operates to reduce the absolute pressure in the reservoir, 13. It is possible in this way to secure in the reservoir 13 a barometric pressure, as much as 24 inches of mercury below atmospheric pressure. In any event it is possible to maintain continuously in the reservoir 13 a pressure substantially below atmospheric and the difference between this and atmospheric pressure is adequate for the operation of the brakes.

The reservoir 13 has a connection 16 controlled by a stop valve 17, and leading to a reservoir line 18. This reservoir line is connected at 19 with the head end of a brake cylinder 20, whose piston 21 is provided with a rolling packing ring 22, and is urged in a releasing direction, i. e., away from the head end, by a coil spring 23. The opposite end of the cylinder 20 is also closed and is provided with a stuffing box 24, through which passes a piston rod 25 connected to the brake rigging (not shown) by a link 26. The connections are such that when the piston 21 moves toward the head end (i. e., toward the right in Figure 1) the brakes will be applied. The reservoir line 18 is connected by flexible hose 27 and releasable couplings 28, 29 with a reservoir line 30, on the trailing vehicle. The line 30 is connected to a supplemental reservoir 31 carried by the trailing vehicle, and is also connected at 32 with the head end of a brake cylinder 20$^a$ identical with that on the motor vehicle. The parts of this brake cylinder are similarly numbered but with the subscript "a," and require no further description.

Leading from the cock 17 and in open communication with the reservoir line 18, is a connection 34 leading to the casing 35 of the brake valve. This valve casing is provided with a valve seat 36 and connection 34 communicates with a port 37 terminating in this valve seat. A second port 38 also in this valve seat communicates with the connection 39 leading to the brake pipe 40, which is connected at 41 with the left end of the brake cylinder 20. The brake pipe 40 is connected by hose 42 and detachable couplings generally indicated by the numerals 43, 44, with the brake pipe 45, on the trailing vehicle. This is connected at 46 with the left end of the brake cylinder 20$^a$ on such vehicle.

The couplings 43 and 44 as clearly shown in Figure 7 carry each a latch nose 47, and each a latch member 48 designed to engage with the latch nose 47 of the other to maintain the two couplings together so that a sealed connection is produced by the gaskets 49. The latch members 48 are pivoted at 50 in lugs 51 and are urged in engaging direction by springs 52.

Each latch member 48 is formed with an extension 53 which under the urge of its spring 52 serves as a flap valve to seal against the corresponding gasket 49, and prevent the entrance of air when the two couplings are pulled apart. As shown in Figure 8, the member 53 on the trailer coupling 43 is provided with a relatively small admission port 54, through which air enters the brake pipe on the trailer to produce a gradual application in case of a break-in-two. The member 53 on the motor vehicle coupling 44 has no such port, but produces a tight seal, so that the brakes on the motor vehicle are left under the control of the operator. Obviously, it is desirable to produce an application on the trailer in case of a break-in-two, and undesirable to produce automatically such an application on the motor vehicle.

The couplings 28 and 29 on the reservoir line are both identical with the coupling 44, i. e., they are devoid of the port 54 and close immediately upon a break-in-two or separation of the coupling, to maintain the reduced pressure in the reservoirs 13 and 31.

The valve casing 35 is provided with a removable top half or cover 56, which is provided with an air inlet connection 57 equipped with a strainer 58. This strainer is shown as consisting of curled hair enclosed in a chamber, but may be constructed in any preferred manner. All the air admitted to the system enters at this point, and it is important to minimize the entrance of dust and grit.

Sliding on the valve seat 36 is a main valve 59. This has an upstanding lug 60 provided with a roller 61. The roller is engaged by the forked end of the lever 62 pivoted as at 63 in a cover 56 and actuated by a reach rod 64, which is connected to the brake pedal lever 65. The lever 65 is drawn rearward or in release direction by a spring 67. While I show a foot pedal, obviously the lever 65 might be operated in any suitable manner.

Spring 67 causes the pedal to act in a manner similar to that characteristic of conventional mechanical brake pedals, but if it were desired to operate the lever 65 manually in both directions, the spring 67 could be omitted.

It follows from the connection above described that the valve 59 assumes a series of positions corresponding to a series of positions of the foot lever 65. It is formed on its lower face with a recess 68, which always is in communication with port 38, and with a second recess 69, which is always in communication with port 37. From the recess 68 a port 70 leads to the top face of the valve 59 and from the recess 69 a second port 71 leads to the top face of the valve 59. Thus the effect of moving the valve 59 is merely to displace the ports 70 and 71 simultaneously a corresponding amount.

Mounted on the top of the main valve 59 is a graduating valve 72, which is formed with a recess 73 on its lower face. In release position the recess 73 connects the ports 70 and 71. In application position the valve 72 clears the port 70 and allows air entering through the strainer 58 in connection 57 to flow through the port 70 and thence by way of the recess 68 in port 38 to the brake pipes 40, 45. Intermediate these two positions the valve 72 blanks port 70 without connecting it with the port 71. The valve 72 moves independently of the valve 59 and is shifted by means of a rod 74 connected with a piston 75. The piston 75 works in a cylinder 76, whose left end is connected by a port 77 with the space above the valves 59, 72, and hence with the atmosphere. The space to the right of the piston 75 is connected by a port 78 with the port 38 and hence with the left end of the brake cylinders 20, 20ª. The ports 37 and 78 do not communicate with each other, but are shown in Figs. 1 and 2 in the same plane of section in accordance with the convention common in the air brake art in order that both ports may be visible in a single more or less diagrammatic view.

A spring 79 urges the piston 75 to the left, and hence assists brake pressure in its action on the piston 75.

Assuming that the motor is running, the reservoirs 13 and 31 will be evacuated. If the valve 59 is in its release position (i. e., to the right as in Figure 1), the cavity 73 will connect the ports 70 and 71, the pressure on opposite sides of the piston 21 will equalize through them, and the spring 23 will move the brake piston to full release position. If, however, the operator should move the brake lever 65 to the right in brake applying direction, the valve 59 would be moved to the left carrying the ports 70 and 71 to the left, so that the port 70 is exposed to atmospheric pressure and disconnected from port 71 (see Figure 2).

Atmospheric air would therefore flow into the left ends of the cylinders 20 and 20ª and move the pistons 21, 21ª to the right, applying the brakes against opposition of the spring 23, 23ª.

As pressure in the left end of the cylinders 20, 20ª rises this pressure will be communicated through the port 78 to the space at the right of the piston 75, and aided by the spring 79 will move the graduating valve 72 to the left until it blanks the port 70, without establishing connection between the ports 70 and 71. The parts will then come to rest in the service lap position of Figure 3.

In case the operator should move the lever 65 to the limit of its motion either from release position or from a partial application position, the parts will assume the position shown in Figure 4. Here the valve 59 is moved so far to the left that the port 70 is carried beyond the leftmost range of action of valve 72. This result is secured by limiting the leftward movement of the piston 75 by properly dimensioning cylinder 76. In Fig. 4 the valve 72 is shown in its leftmost position.

Assuming that the brake has been partially or wholly applied, if the operator moves the lever 65 part way to the left but not to its extreme left hand, or releasing position, the valve 59 will move to the right, and the parts will assume a position such as is shown in Figure 5. Here the recess 73 connects the ports 70 and 71, and equalization of pressure on the opposite sides of the pistons 21, 21ª commences. This entails a reduction of pressure on the left hand side of the pistons 21, 21ª and this is communicated by the port 78, to the space at the right of the piston 75, which piston consequently moves to the right. It continues this movement until valve 72 reaches the lap position shown in Figure 6, in which the pressure equalizing connection between the ports 70 and 71 is interrupted, and in which the port 70 is blanked.

If the brake pedal 65 is restored to release position, as in Figure 1, the ports 70 and 71 are again connected, and this connection is maintained because the piston 75 is then arrested at its right hand limit of motion. Consequently, complete release occurs.

It is obvious that the motor vehicle brake may be operated alone, without the trailer brake. In such case the valves 53 close the couplings 26 and 44 automatically.

Assuming that the vehicle is drawing a trailer, and the train breaks in two, the coupling 44 and the coupling 28 on the motor vehicle would be instantly sealed, leaving the brakes on the motor vehicle under the control of the operator. At the same time, the coupling 29 on the trailer will be closed, maintaining the reduced pressure in the supplemental reservoir 30. The coupling 43 on the trailer, however, will not be sealed. The port 54 permits the gradual admission of air to the left hand side of the piston 21ª, on the trailer, producing a gradual application of the brake and stopping the trailer, so that it cannot run into the leading vehicle.

While I prefer to connect the system to the intake manifold of the engine, it is obvious that the system may be made to work satisfactorily with any other suitable means for evacuating the reservoirs. Similarly, there are certain characteristic features of the brake valve which are not limited in their utility to a sub-atmospheric pressure brake.

What is claimed is:

1. An application valve mechanism for brake systems of the type including a double acting brake cylinder, a reservoir, a reservoir pipe connected with said reservoir and with one end of the cylinder, and a brake pipe connected with the other end of the cylinder, said application valve mechanism comprising in combination a valve seat shiftable at will and provided with two ports respectively in constant communication with the brake pipe and reservoir pipe; a valve shiftable on said seat and serving in one position to connect said ports, in another to disconnect them and admit atmospheric air to the brake pipe port, and in an intermediate position to blank both ports; a piston connected with said valve and subject to atmospheric pressure and brake pipe pressure in opposite directions, brake pipe pressure urging said valve to the first named position; and resilient means acting on said piston assisting brake pipe pressure.

2. In a brake valve the combination of a main application and release valve capable of being set in a release position and in a progressive series of application positions; a graduating valve controlling an application port in said main valve subject to brake cylinder pressure and shiftable thereby in the direction of motion of said main valve from release through the series of application positions; and means for exerting a resistance to the motion of said graduating valve increasing progressively with the motion of the valve.

3. An automatic valve for air brakes comprising in combination a ported shiftable seat; means for shifting said seat at will; a valve movable on said seat and coacting with the ports therein to produce application lap and release; a piston connected with said valve and subject to brake cylinder pressure urging said valve toward release position; and yielding means resisting such motion of the valve.

4. An automatic valve for air brakes comprising in combination, a ported shiftable seat; means for shifting said seat at will; a valve movable on said seat and coacting with the ports therein to produce application, lap and release; and a piston connected with said valve to move the same and subject in opposite directions to atmospheric pressure and brake cylinder pressure.

5. In a brake valve the combination of a main application and release valve capable of being set in a release position and in a progressive series of application positions; a graduating valve controlling the application port in said main valve subject to brake cylinder pressure and shiftable thereby in the direction of motion of said main valve from release through a series of application positions; means for limiting such movement of the graduating valve to a range less than the range of movement of the main valve, whereby in the extreme application position of the main valve its application port is beyond control by said graduating valve; and means for exerting a resistance to the motion of said graduating valve increasing progressively with the motion thereof.

6. An application valve mechanism for brake systems of the type including a double acting brake cylinder, a reservoir, a reservoir pipe connected with said reservoir and with one end of the cylinder, and a brake pipe connected with the other end of the cylinder, said application valve mechanism comprising in combination a valve seat shiftable at will and provided with two ports respectively in constant communication with the brake pipe and reservoir pipe; a valve shiftable on said seat and serving in one position to connect said ports, in another to disconnect them and admit atmospheric air to the brake pipe port, and in an intermediate position to blank both ports; a piston connected with said valve and subject to atmospheric pressure and brake pipe pressure in opposite directions, brake pipe pressure urging said valve to the first named position; resilient means acting on said piston assisting brake pipe pressure; and means for limiting the motion of said valve under the combined action of brake pipe pressure and said resilient means to a range less than the range of motion of said valve seat, whereby in the extreme setting of the seat said valve may not lap said brake pipe port.

In testimony whereof I have signed my name to this specification.

CHARLES ALBERT CAMPBELL.